(12) United States Patent
Noel, II

(10) Patent No.: US 9,380,910 B1
(45) Date of Patent: Jul. 5, 2016

(54) PORTABLE FOOD GRILLING APPARATUS

(71) Applicant: Phares Azarael Noel, II, Detroit, MI (US)

(72) Inventor: Phares Azarael Noel, II, Detroit, MI (US)

(*) Notice: Subject to any disclaimer, the term of this patent is extended or adjusted under 35 U.S.C. 154(b) by 361 days.

(21) Appl. No.: 14/211,103

(22) Filed: Mar. 14, 2014

(51) Int. Cl.
*A47J 37/07* (2006.01)
*F24C 3/00* (2006.01)
*F24C 5/20* (2006.01)

(52) U.S. Cl.
CPC .............. *A47J 37/0704* (2013.01); *A47J 37/07* (2013.01); *F24C 3/00* (2013.01); *F24C 5/20* (2013.01)

(58) Field of Classification Search
CPC ......... A47J 37/0704; A47J 37/07; F24C 3/00; F24C 5/20
USPC .......... 126/25 R, 9 R, 41 R, 4, 5; 99/340, 385
See application file for complete search history.

(56) References Cited

U.S. PATENT DOCUMENTS

| | | | |
|---|---|---|---|
| 5,413,087 A * | 5/1995 | Jean .......................... | F24C 3/14 126/38 |
| 5,832,915 A * | 11/1998 | Skidmore ........... | A47J 37/0763 126/25 R |
| 6,543,435 B1 * | 4/2003 | Regen .................. | A47J 37/0731 126/25 R |
| 6,739,329 B2 * | 5/2004 | Wu ...................... | A47J 37/0763 126/25 R |
| 7,284,549 B1 | 10/2007 | Eby et al. | |
| 7,766,004 B1 * | 8/2010 | Bourgeois ............... | A47J 36/26 126/25 R |
| 8,915,238 B2 * | 12/2014 | Goeken ............... | A47J 37/0704 126/25 R |
| 2005/0126556 A1 * | 6/2005 | Bossler ............... | A47J 37/0786 126/25 R |
| 2008/0041359 A1 * | 2/2008 | Kim .................... | A47J 37/0718 126/25 R |

FOREIGN PATENT DOCUMENTS

FR    WO0193734 A2    12/2001

* cited by examiner

*Primary Examiner* — Gregory Huson
*Assistant Examiner* — Nikhil Mashruwala
(74) *Attorney, Agent, or Firm* — Singh Law Firm, PLLC; Gautam B. Singh

(57) ABSTRACT

This invention is a portable food grilling apparatus designed to be collapsible and foldable for easy transportation. A substantially hemispherical full sized kettle is sectioned into plurality of two or more kettle sections where each section is adapted to be fastened to form a full sized kettle when needed and unfastened to facilitate storage and transportation. The stand upon which the kettle is mounted is also which folds into a planar conformation. The kettle sections, cover, and catcher are further adapted to insert into each other so as to also form a planar conformation. These two sections are adapted to fit into a carrying case for easy transportation.

14 Claims, 4 Drawing Sheets

PORTABLE FOOD GRILLING APPARATUS

FIELD OF THE INVENTION

The present invention is a food grilling and barbecue apparatus designed to be foldable and collapsible and adapted to fit into a carrying case for easy portability.

BACKGROUND OF THE INVENTION

Grilling as a way of cooking has existed since pre-historic times with our ancestors using wooden, metallic or stone structures to roast animals. Grilling has also been applied to the pit style cooking techniques originally used to slow cook hogs. Grilling, as a different way for preparing the food, led to regional variations and in time a variety of food was cooked in a similar fashion with hamburgers and hot dogs being recent additions to food grilled routinely.

A food grill is a device for cooking or barbecuing food by applying heat directly from below. There are several common varieties of such grills with most falling into either gas-fueled, or charcoal fueled. Grilling Apparatus generally utilizes a chamber where the cooking actually occurs with heat provided by a sub-apparatus that utilizes fuel that is typically either a form of combustible gas i.e. natural gas or propane, or some other form of combustible material i.e. charcoal or wood.

Traditionally, the outdoors gas grill or barbecue apparatus was designed as either an open fire charcoal type or a grill utilizing gas-fueled burners for an open broiler type design. These types of outdoor designs currently available in the market do not lend themselves to easy portability as either the large kettle structure and/or broiler makes it cumbersome for transportation.

What is needed is a portable food grilling apparatus that is regular in size for outdoor needs for normal food grilling and barbecuing events as well as is foldable and collapsible for easy portability and transportability.

SUMMARY OF THE INVENTION

The embodiments herein provide for enhancements to the existing apparatus currently available in the market place to serve as a portable grill for cooking or barbecuing food. Furthermore, the embodiments herein provide for enhancements to the process of folding the entire grilling apparatus into a form where it easily fits into a carrying case, or a similar carrying container. These embodiments will be described and illustrated primarily in relation to a grilling apparatus that works as a full sized grill capable of operating on a plurality of fuels in a dual use manner. Its dual use arising out of the same grill functioning adequately for serving guests at a backyard barbecue party, and as needed to be later collapsed into a compact form for easy transportation.

It will be appreciated by those skilled in the art, however, that this description is not intended to limit the scope of the described embodiments to implementation on a particular shape. For example, the methods and apparatus described herein are applied to a multitude of kettle shapes including spherical, hemispherical, cube, and rectangular prism or a morphed volume generated from known or unknown shapes.

Thus, the embodiments described herein are implemented on a tripod shaped supporting structure. One skilled in the art will appreciate that such foldable support frames may be built to conform to tabular, truss or other similar configurations.

As disclosed herein, one skilled in the art will appreciate that the sectioning of the kettle and use of fasteners that enables the reassembled kettle to achieve a monolithic kettle conformation wherein the kettle sections are adapted to fit securely into one another. The support base structure is adapted to and takes folded conformation that occupies minimal volume and complements the shape of the kettle structure so that together the kettle structure and the support structure can occupy a predefined desired conformation and dimensions to fit into a carrying case that facilitates transportation.

In a similar manner the supporting base is also collapsible and can, in an embodiment of the invention, fold into a substantially planar conformation easily communicated to the interior of a carrying case wherein it occupies the bottom section of the case, whereupon the kettle assembly is subsequently stacked. Alternately, the kettle assembly when folded achieves a substantially planar conformation easily communicated to the interior of a carrying case wherein it occupies the bottom section of the case, whereupon the folded supporting based is stacked.

BRIEF DESCRIPTION OF THE DRAWINGS

The invention will be described in conjunction with the attached drawings in which like referenced numerals designate like elements, and wherein.

Figure 1:
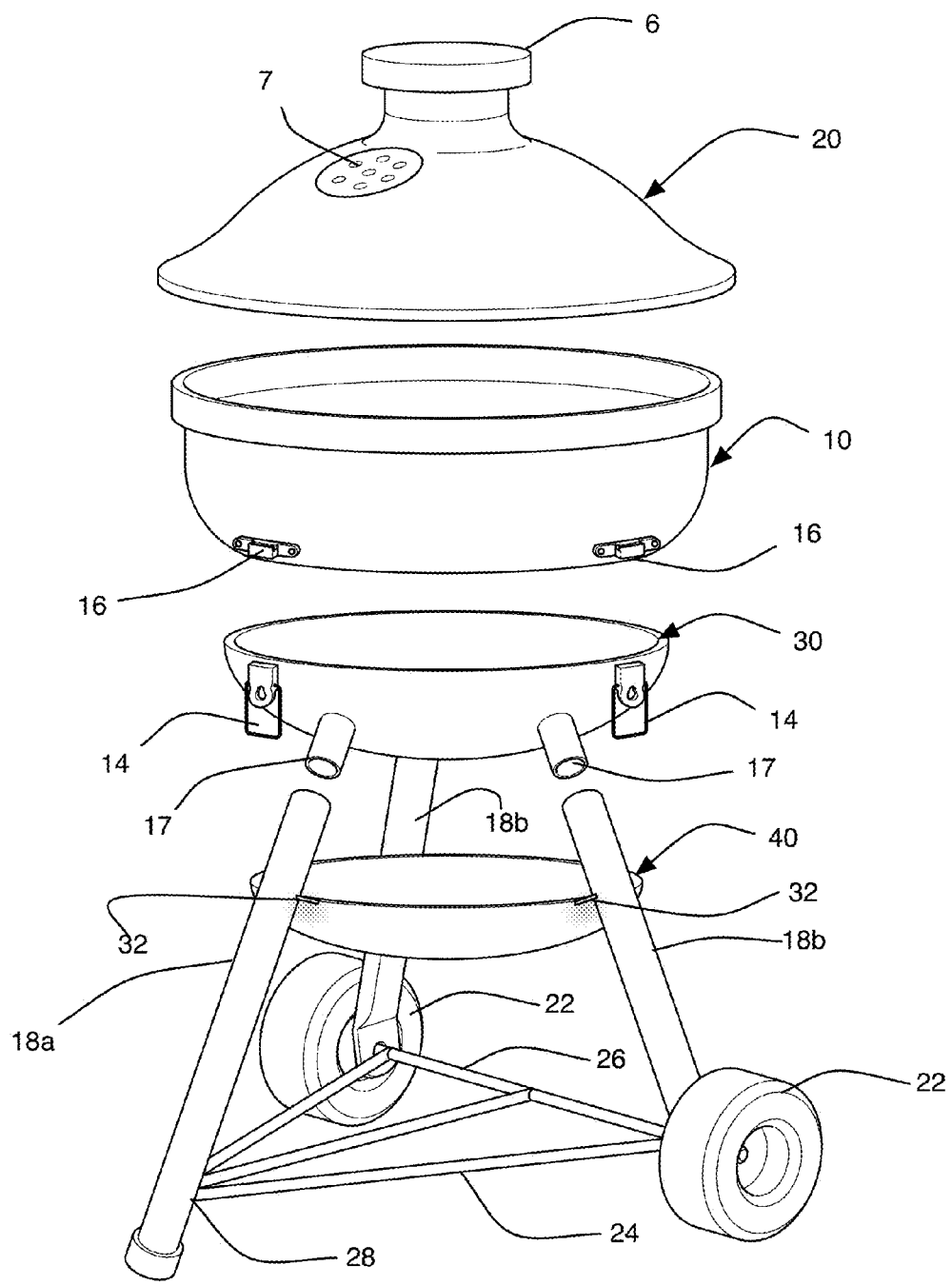
FIG. 1 is a view of an embodiment of the foldable grill.

| DRAWINGS - Reference Numerals | |
| --- | --- |
| Kettle Cover Handle | 6 |
| Cover Vent | 7 |
| Kettle Cover Handle | 8 |
| Kettle Handle | 9 |
| Upper Kettle Portion | 10 |
| Kettle Fastener Clamp Receiver | 4 |
| Kettle Fastener Clamp | 16 |
| Tripod Leg Attachment | 17 |
| Front Tripod Leg | 18a |
| Rear Tripod Legs | 18b |
| Tripod Leg Fastener | 19 |
| Kettle Cover | 20 |
| Tripod Leg Fastener Receptacle | 21 |
| Wheel | 22 |
| Tripod Base | 24 |
| Axle | 26 |
| Tripod Frame to Leg Snap | 28 |
| Lower Kettle Portion | 30 |
| Ash Catcher Tray Snap | 32 |
| Ash Catcher Tray | 40 |
| Carrying Case | 50 |

DETAILED DESCRIPTION OF THE INVENTION

The use of grilling, or barbecue cooking over open flame, can be traced back to the ancient time and cooking over smoke and flame is traceable to the time when humans transitioned from foraging plants to eating meat. Humans realized that meat was efficient source of nutrition with provided a readily available source of protein. The early human also discovered that the easiest ways to preserve meat was to smoke it over open flame. The heat provided by open flame killed harmful pathogens and also made meat tender and therefore easier to eat. The effect of smoking meat—with smoke coming into contact with the meat—also acted as a preservative thereby preventing it from getting spoiled.

This preferred method of cooking meat is the reason that using grill or barbecue is popular within our culture. Barbecue grills are used in festivities and generally associated with outdoors, with families backyards generally equipped with a barbecue. With the passage of time we began using different types of grills based on what we found to be convenient. We have been using gas grills for quickness and efficiency, charcoal grills for that old-fashioned barbecue flavor, and portable barbecues to save space on a balcony or deck. Electric grills are also gaining popularity due to their convenience although the traditional taste of barbeque has been associated with cooking with fire and smoke.

What is disclosed in herein is a food grilling apparatus that is designed for ease of portability. The disclosed invention is not limited by the source of fuel used and can be adapted for use with different types of heat sources. The disclosed invention can be easily disassembled and folded into a compact form and carried in a case. The portable design does not compromise on the size of the kettle; the overall volume and spaciousness of the kettle is preserved by cutting the kettle into a plurality of sections that are each provisioned with a plurality of fasteners to re-assemble kettle sections into a full sized kettle.

The food grilling apparatus' kettle is mounted on a tripod frame also designed to facilitate portability. In an embodiment of the invention, the grilling apparatus is mounted upon a three-legged tripod frame. The legs of the griller are detachable from the kettle. The base of the tripod legs is supported by a frame that is provisioned with an axle that allows the installation of a pair of wheels to help move the grill about. The frame is foldable, and allows the entire support structure to be collapsed into a compact planar conformation that is readily packaged into a carrying case for easy portability.

Illustrated next in FIG. 1 is a perspective view of an embodiment of the invention wherein the grilling kettle is split into two parts. The kettle is the part of the food grill where the food items are cooked. In an embodiment of the invention, the kettle is split into an Upper Kettle Portion 10 and a Lower Kettle Portion 30. The Upper Kettle Portion 10 and the Lower Kettle Portion 30 are secured through a plurality of fasteners. Each of the plurality of fastener has a Kettle Fastener Clamp 14 that is fixedly attached to the Lower Kettle Portion 30, and a Kettle Fastener Clamp Receiver 16 fixedly attached to the Upper Kettle Portion 10. The Kettle Fastener Clamp 14 and Kettle Fastener Clamp Receiver 16 when engaged with each other form a fully constrained assembly of the Upper Kettle Portion 10 and the Lower Kettle Portion 30.

The Upper Kettle Portion 10 is equipped with a Kettle Cover 20 that includes a Kettle Cover Handle 6 and a Cover Vent 7. The Lower Kettle Portion 30 is attached to a support frame. In an embodiment of the invention the support frame is shaped like a tripod having an upper end and a lower end. The tripod structure comprises of one Front Tripod Leg 18a, and two Rear Tripod Legs 18b wherein each of Front Tripod Leg 18a and Rear Tripod Legs 18b is connected to the upper end and the lower end of the support frame. The upper end of the Front Tripod Leg 18a and the upper ends of the Rear Tripod Legs 18b are each attached to the Lower Kettle Portion 30 using a Tripod Leg Attachment 17. The lower end of the Front Tripod Leg 18a and lower ends of the Rear Tripod Legs 18b are attached to a Tripod Base 24 wherein the Tripod Base 24 comprises of a plurality of beams including an Axle 26. The Axle 26 includes two ends. The Axle 26 runs through holes in the lower end of the Rear Tripod Legs 18b adapted to receive the Axle 26. The lower end of the Front Tripod Leg 18a is connected to Tripod Frame-to-Leg Attachment 28. A wheel 22 is mounted on each of the two ends of the Axle 26. Tripod Base 24 is adapted to support Front Tripod Leg 18a and Rear Tripod Legs 18b in a sturdy position enabling the grilling process to occur in a stable and sturdy kettle resting on a firm foundation.

An Ash Catcher Tray 40 is encapsulated within a plurality Front Tripod Leg 18a and Rear Tripod Legs 18b. A plurality of Ash Catcher Tray Snaps 32 engages the rim of the Ash Catcher tray to hold Ash Catcher Tray 40 in place. A further use of the Ash Catcher Tray 40 is to prevent any food pieces dropping out of the kettle onto the floor or ground.

Figure 2:
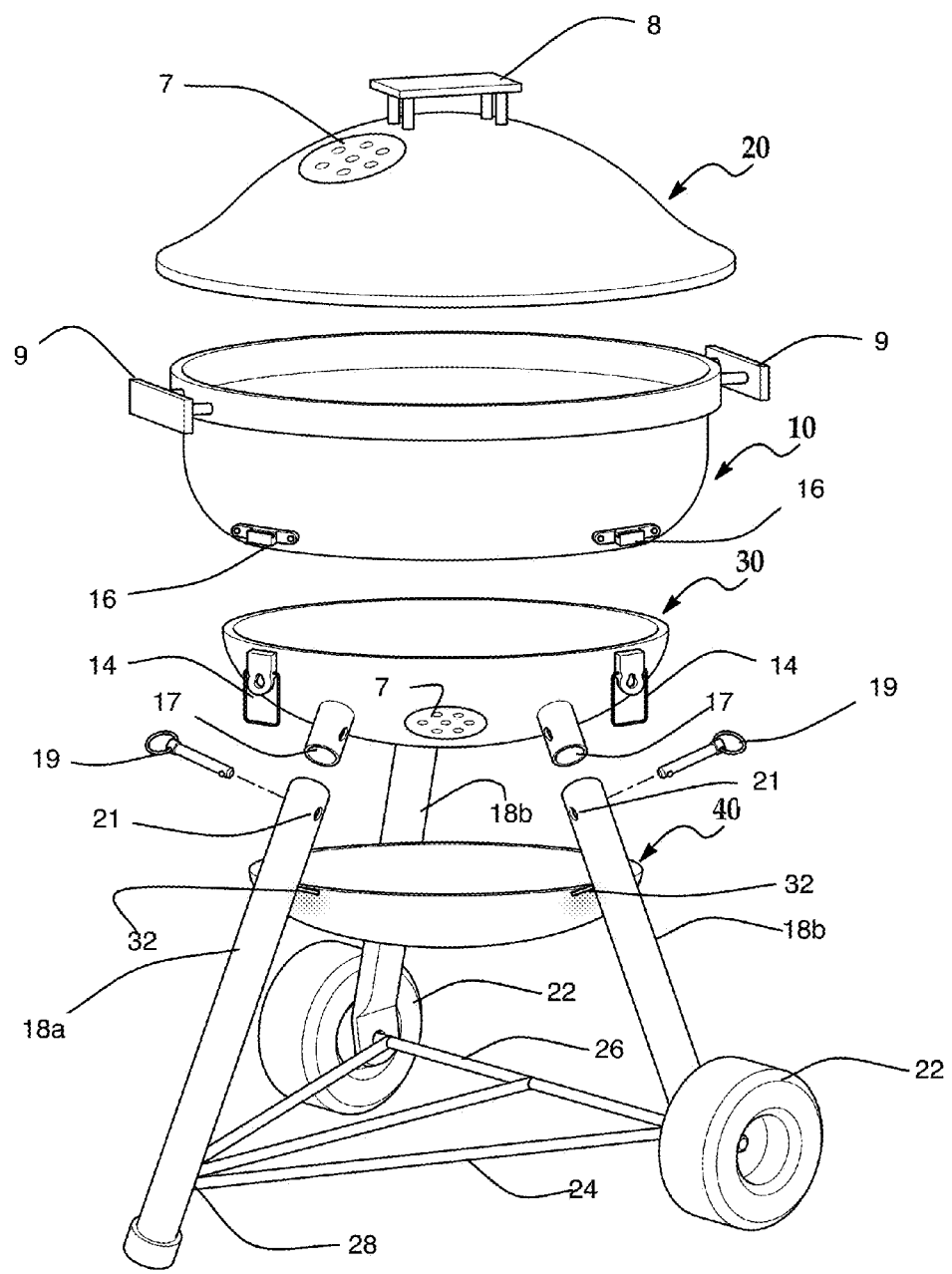
FIG. 2 is a view of an embodiment of the foldable grill.

Illustrated next in FIG. 2 is a perspective view of an embodiment of the invention. The Upper Kettle Portion 10 is equipped with a plurality of handles 9. The Kettle Cover 20 is provisioned with a Kettle Cover Handle 8. The upper end of the Front Tripod Leg 18a and Rear Tripod Legs 18b are each attached to the Lower Kettle Portion 30 using a Tripod Leg Attachment 17. The Lower Kettle Portion 30 includes a plurality of Vents 7. The Tripod Leg Attachment 17 is affixed to the Front Tripod Leg 18a and Rear Tripod Legs 18b using a Fastener 19 inserted into a hole 21 running through the Tripod Leg Attachment 17 and Front Tripod Leg 18a and Rear Tripod Legs 18b.

In an embodiment of the invention, the kettle potions are constructed with lightweight mild steel metal with a baked enamel finish to prevent corrosion. In an embodiment of the invention, the kettle portions are made up of some form of heat resistant synthetic composite material. In an embodiment of the invention, the Lower Kettle Portion 30 is constructed with two layered shells wherein the inner shell provides insulation and is constructed using spun fiberglass, and the outer shell is lightweight protective and cosmetic material with the resulting configuration having the advantage of maintaining a much lower temperature of the outer shell whereby reducing the cooling time required before placement of the grill in a Carrying Case 50. In an embodiment of the invention, the Lower Kettle Portion 30 includes a temperature indicator attached to the outer surface to visually indicate or display a message with information of the temperature of the kettle or otherwise indicate that the kettle is cool enough to handle and transport.

Figure 3:
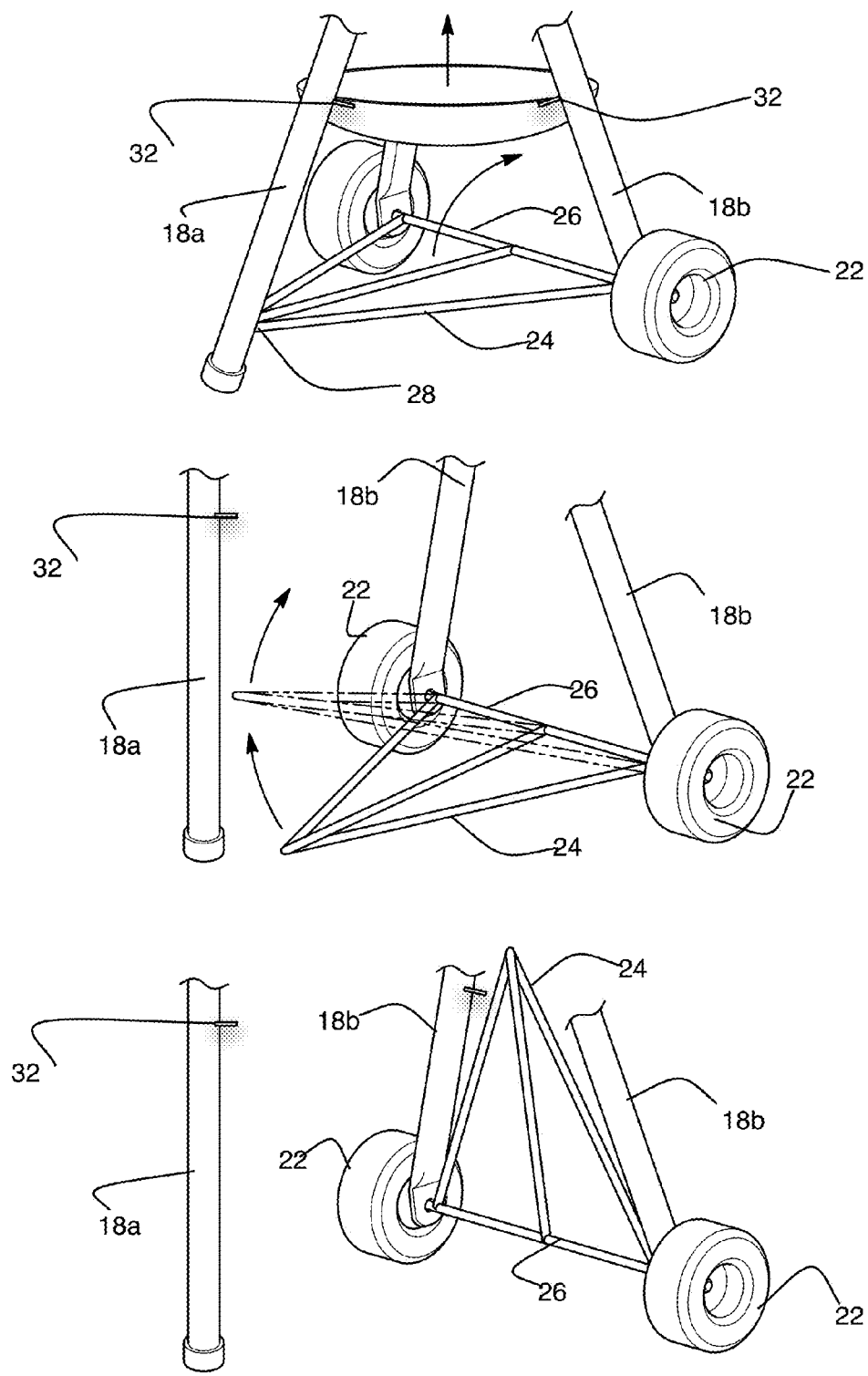
FIGS. 3-4 illustrate the process of packaging the collapsible grill wherein the various components collapse are adapted fit into each other.
Figure 4:
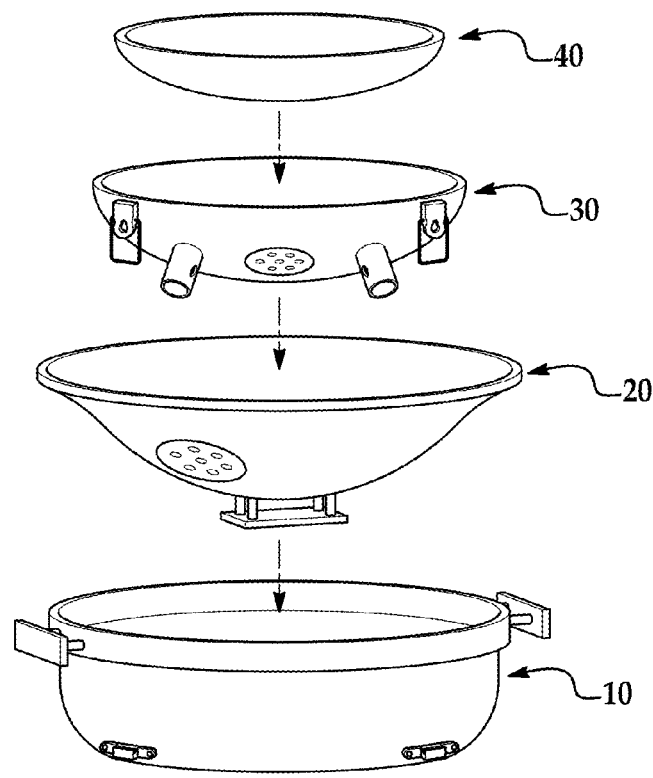

Illustrated next in FIGS. 3-4 are the steps for a process of folding and packing an embodiment of the invention. The Upper Kettle Portion 10 is adapted to hold the Kettle Cover 20. The Kettle Cover 20 is adapted to hold the Lower Kettle Portion 30. The Lower Kettle Portion 30 is adapted to hold the Ash Catcher Tray 40.

As illustrated in FIG. 3, the tripod assembly is packaged by disengaging the Tripod Frame to Leg Snap 28 thereby making the Tripod Base 24 free to rotate about the Axle 26. With the Ash Catcher Tray 40 previously removed the Tripod Base is rotated till it is aligned with the plane formed by the two Rear Tripod Legs 18b. In this manner, the Tripod Base 24, Rear Tripod Legs 18b collectively conforms into a compact planar structure.

As illustrated in FIG. 4 in an embodiment of the invention the kettle assembly includes the Upper Kettle Portion 10, Lower Kettle Portion 30, Kettle Cover 20, and the Ash Catcher Tray 40. Unfastening the plurality of Kettle Fastener Clamp Receiver 14 from Kettle Fastener Clamp 16 and disengaging the Upper Kettle Portion 10 from the Lower Kettle Portion 30 to begin packing the kettle assembly for portability. Next, the Kettle Cover 20 is placed inside the Upper Kettle Assembly 10. Next the Lower Kettle Assembly is placed inside the Kettle Cover 20. Next, the Ash Catcher Tray 40 is inserted into Lower Kettle Assembly 30.

Figure 5:
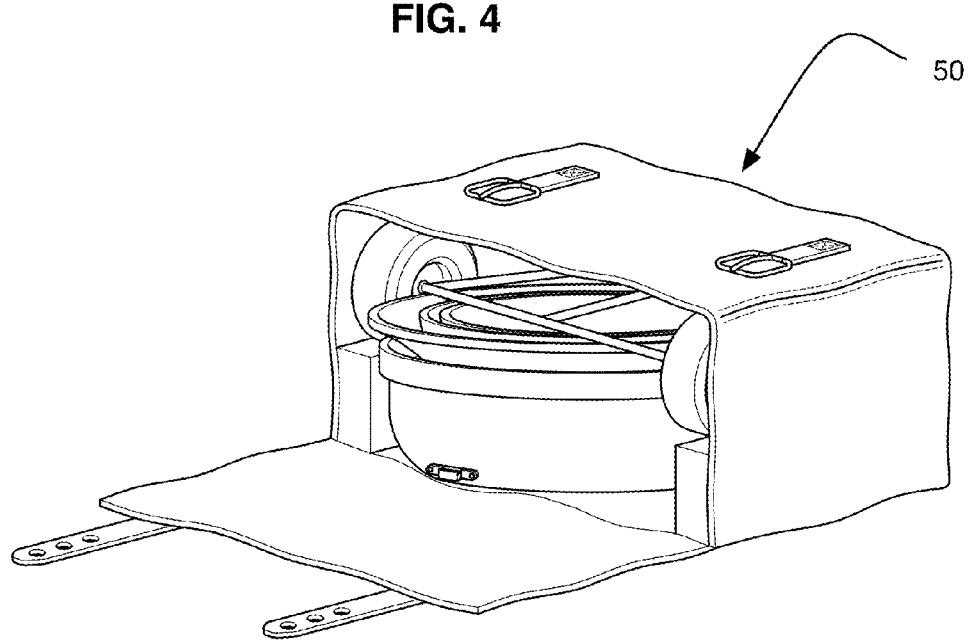
FIG. 5 illustrates the portable grill collapsed and packed into a carrying case.

Illustrated in FIG. 5 is the Grilling Apparatus disclosed in a packaged conformation. The tripod assembly and the wheels are placed in conformation with the compact kettle assembly. The packaging conformation uses the tripod assembly as the base upon which the kettle assembly is stacked. In another packaging conformation, the kettle assembly acts as the base upon which the tripod assembly is stacked. The stacked conformation allows the two subunits to be easily packaged into a case as illustrated.

While several aspects have been presented in the foregoing detailed description, it should be understood that a vast number of variations exist and these aspects are merely an example, and it is not intended to limit the scope, applicability or configuration of the invention in any way. Rather, the foregoing detailed description provides those of ordinary skill in the art with a convenient guide for implementing a desired aspect of the invention and various changes can be made in the function and arrangements of the embodiments of the invention without departing from the spirit and scope of the appended claims. The foregoing description is illustrative of particular embodiments of the invention, but is not meant to be a limitation upon the practice thereof. The following claims, including all equivalents thereof, are intended to define the scope of the invention.

What is claimed is:

1. A portable and foldable food grilling apparatus comprising
    a grilling kettle including
        a upper kettle portion having a lateral surface enclosing a volume and having an upper end and a lower end where the upper end and the lower end are open,
        a lower kettle portion having a lateral surface enclosing a volume and having an upper end that is open and a lower end,
        wherein the lower end of the upper kettle portion is detachably fastened to the upper end of lower kettle portion;
    a kettle cover having an upper surface and a lower surface, encloses a cavity and is adapted to cover the open upper end of the upper kettle portion when the lower surface is in communication with the open upper end of the upper kettle portion wherein the volume enclosed by the upper kettle portion is adapted to accommodate the kettle cover when the upper surface is in communication with the open upper end of upper kettle portion, and the cavity enclosed by the kettle cover is adapted to accommodate the lower kettle portion;
    a support frame including
        a pair of rear legs with each of the pair of rear legs has an upper end and a lower end wherein the lower end of each of the pair of rear legs has a hole,
        a front leg having an upper end and a lower end,
        a tripod base has
            an axle having two ends where the axle passes through the holes in lower ends of each of pair of rear legs,
            a plurality of beams each having a left end and a right end with the right end connected to the axle and the left end connected to the lower end of front end,
        where the upper end of the pair of rear legs and the upper end of the front leg are detachably connected to the lower end of the lower kettle portion;
    where upon detaching the support frame from the lower kettle portion, upon enclosing the lower kettle portion into the upper kettle portion, and upon enclosing the kettle cover in the upper kettle portion, the grilling kettle and the kettle cover assume a compact conformation.

2. A portable and foldable food grilling apparatus of claim 1 wherein the grilling kettle is constructed with light weight mild steel metal with a baked enamel finish.

3. A portable and foldable food grilling apparatus of claim 1 wherein the grilling kettle is constructed using a heat resistant composite material.

4. A portable and foldable food grilling apparatus of claim 1 wherein the lower kettle portion is constructed with two layered shells wherein the inner shell is constructed using spun fiberglass and the outer shell is lightweight protective and cosmetic material.

5. A portable and foldable food grilling apparatus of claim 1 wherein the lower kettle portion includes a temperature indicator.

6. A portable and foldable food grilling apparatus of claim 1 wherein each of ends of the axle is attached to a wheel.

7. A portable and foldable food grilling apparatus of claim 1 wherein the kettle cover includes a plurality of vents.

8. A portable and foldable food grilling apparatus of claim 1 wherein the lateral surface of the lower kettle portion includes a plurality of vents.

9. A portable and foldable food grilling apparatus of claim 1 wherein the kettle cover includes a handle.

10. A portable and foldable food grilling apparatus of claim 1 wherein the upper kettle portion includes a plurality of handles.

11. A portable and foldable food grilling apparatus of claim 1 where each of the pair of rear legs and the front leg includes catcher tray snap adapted to hold a catcher tray.

12. A portable and foldable food grilling apparatus of claim 1 wherein
    the upper end of each of the pair of rear legs and the upper end front leg includes a receptacle adapted to receive a fastener; and
    the lower end of the lower kettle portion includes a plurality of attachments where each attachment has two ends with one end fixed to the lower end of the lower kettle portion and the other end includes a receptacle adapted to receive a fastener.

13. A portable and foldable food grilling apparatus of claim 1 where a surface whereupon items to be barbecued and grilled are placed is in communication between the upper kettle portion and the lower kettle portion.

14. A method for storing a portable and foldable food grilling system comprising of a grilling kettle with an upper kettle portion having an upper end and a lower end, a lower kettle portion, a kettle cover having an upper surface and a lower surface, a catcher tray, and a support frame with a plurality of rear legs and a front leg, where each of the plurality of rear legs has an upper end and a lower end, the front leg has a upper and a lower end, wherein the upper end of the plurality of rear legs and the upper end of the front leg are detachably attached to the lower kettle portion, and the lower end of the plurality of rear legs is attached to an axle, a base frame having two ends where the first end is attached to the axle and the second end is attached to the lower portion of the front leg where the upper kettle portion is adapted to accommodate the lower kettle portion and the kettle cover, the lower kettle portion adapted to accommodate the catcher tray, and where upon detaching the support frame from the lower kettle portion, enclosing the lower kettle portion into the upper kettle portion, and enclosing the kettle cover in the upper kettle portion, the grilling kettle and the kettle cover assume a compact conformation;

the method comprising the steps of:
forming a kettle assembly whereby the kettle assembly assumes a compact conformation by
detaching the support from the lower kettle portion,
inserting the kettle cover inside the upper kettle portion by having the upper surface come into communication with the upper end of the upper kettle portion,
inserting the lower kettle portion into the kettle cover, and
inserting the catcher tray into the lower kettle portion;
forming a portable support assembly by
detaching the base frame from the front leg, and
rotating the base frames axle till the base frame gets included within the rear legs;
inserting the portable support assembly and the kettle assembly into a case adapted to accommodate the portable support assembly, wheels, and the portable kettle assembly.

* * * * *